United States Patent
Ohtsu et al.

(10) Patent No.: US 6,697,235 B2
(45) Date of Patent: Feb. 24, 2004

(54) MAGNETORESISTIVE HEAD AND MAGNETIC RECODING/REPRODUCING APPARATUS USING THE SAME

(75) Inventors: Takayoshi Ohtsu, Ohi (JP); Koichi Nishioka, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 101 days.

(21) Appl. No.: 10/041,611

(22) Filed: Jan. 10, 2002

(65) Prior Publication Data

US 2002/0160228 A1 Oct. 31, 2002

(30) Foreign Application Priority Data

Apr. 26, 2001 (JP) .................................. 2001-129661

(51) Int. Cl.[7] ................................................ G11B 5/39
(52) U.S. Cl. ................................................ 360/324.12
(58) Field of Search ........................ 360/324.1, 324.11, 360/324.12, 324.2, 327.3, 327.31, 327.32

(56) References Cited

U.S. PATENT DOCUMENTS 6,157,526 A * 12/2000 Watanabe et al. ...... 360/324.12
6,266,218 B1 * 7/2001 Carey et al. ........... 360/324.12
6,353,318 B1 * 3/2002 Sin et al. .................... 324/252
6,493,194 B1 * 12/2002 Sakaguchi et al. .......... 360/322

FOREIGN PATENT DOCUMENTS

WO 97/11458 * 3/1997

* cited by examiner

Primary Examiner—David L. Ometz
(74) Attorney, Agent, or Firm—Antonelli, Terry, Stout & Kraus, LLP (57) ABSTRACT

A magnetoresistive head includes a substrate, first and second magnetic shields, a magnetoresistive effect film formed within a gap layer between the first and second magnetic shields, a permanent magnet layer provided on both sides of the magnetoresistive effect film in order to apply a magnetic field to the film, and an electrode film provided on the permanent magnet layer so as to permit a signal detected current to flow, wherein a magnetic film is stacked on the permanent magnet layer with a nonmagnetic separation layer interposed between the permanent magnet layer and the magnetic film so that the magnetic film has formed therein a magnetic path, thus, it is possible to provide a GMR reproduce head of which the reproduction sensitivity can be maintained high even if the track width is narrow.

7 Claims, 7 Drawing Sheets

PRIOR ART          EMBODIMENT

MAGNETORESISTIVE HEAD AND MAGNETIC RECODING/REPRODUCING APPARATUS USING THE SAME

BACKGROUND OF THE INVENTION

The present invention relates to magnetic recording/reproducing head with magnetoresistive head, and particularly to the structure of the magnetic domain control film of a magnetoresistive head and to the technology for magnetic domain control by GMR film.

In recent years, as the magnetic recording/reproducing apparatus has achieved high-density recording capability, GMR heads for reproducing heads have been practically used which employ spin valve films having magnetoresistive effect as sensor films and permanent magnet layer abutted junction for magnetic domain control, thus making the reproducing track width narrower.

Figure 9:
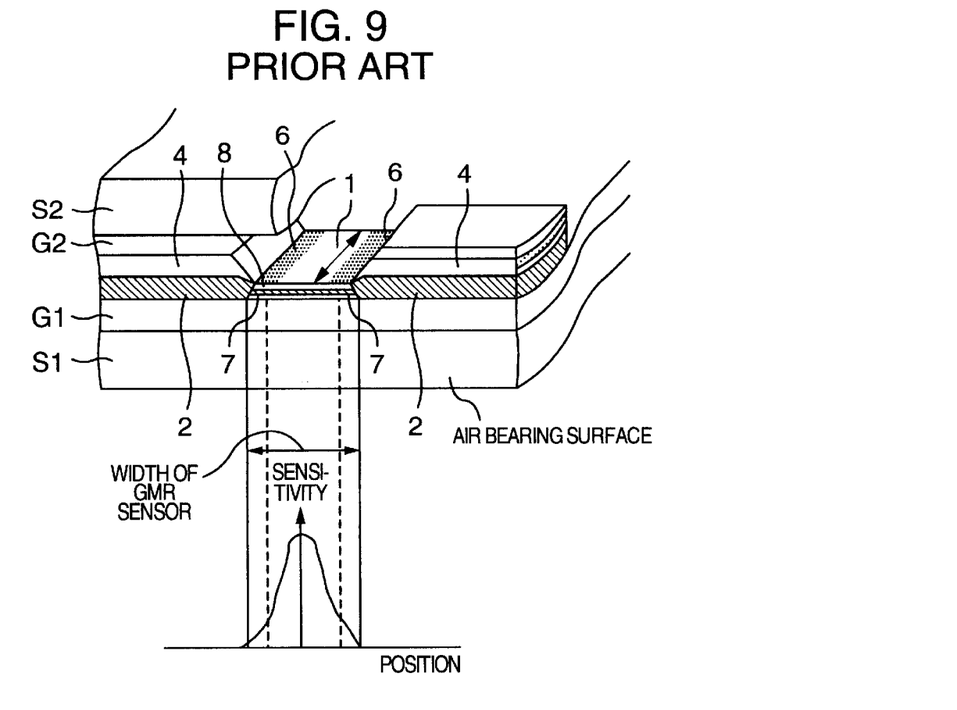
FIG. 9 is a perspective view of a conventional permanent magnet layer abutted junction type head as viewed from below, and a diagram showing the sensitivity distribution of the head.

FIG. 9 shows the structure of a conventional magnetic head of the abutted junction type. This structure has a GMR sensor film 1, a permanent magnet layer 2 and an electrode film 4 intervened between two magnetic shields S1 and S2. The permanent magnetic layer 2 is abutted to both the edges of the GMR sensor film 1, and the electrode film 4 is formed immediately above the layer 2. The electrode film 4 and the permanent magnetic layer 2 (which also has conductivity) serve as electrodes for causing current to flow in the GMR film. The permanent magnetic layer 2 also plays a role for domain control to apply a magnetic field to a free layer 8 that constitutes the GMR film 1, thereby making the orientation of domains in a uniform direction.

Since the strength of the magnetic field from the permanent magnet layer 2 increases with the decrease of the distance to the magnet layer 2 (see FIG. 3 that shows the distribution of the field strength when the position on the free layer is changed in the track width direction), the magnetization rotation of the free layer in a small region of the GMR film near the permanent magnet layer is restricted by the field from the permanent magnet layer (the orientation of the magnetic domains is strongly fixed by the intense field strength), thus giving rise to a region in which the sensor sensitivity is low (the orientation of magnetic domains becomes difficult to change under the magnetic field from a magnetized recording medium, thus the sensitivity of magnetic head being reduced). This region will be hereinafter referred to as "low-sensitivity region".

Although a sensitivity distribution of the sensor is shown on the bottom of FIG. 9, both the skirts of the peak of the sensitivity distribution correspond to the "low-sensitivity region" as indicated by reference numeral 6. The low-sensitivity region is located over about 0.05~0.1 μm from the edges of the permanent magnet. When the reproducing track width is as large as, for example, 1 μm, the proportion of the low-sensitivity region to the reproducing track width is about 0.2 and thus it is not so significant. However, if the reproducing track width is too narrow, the proportion of the low-sensitivity region to the reproducing track width increases, so that the reproduction output suddenly decreases.

Figure 10:
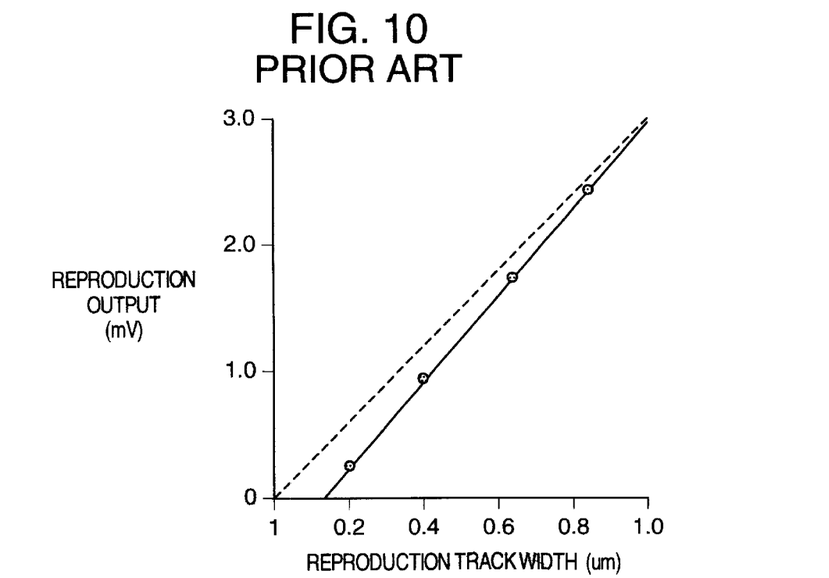
FIG. 10 is a graph showing the dependency of the reproduction output on the track width in the prior art.

FIG. 10 shows the dependence of the reproduction output on the reproducing track width (dimensional, geometric track width) under a constant MR height (that is a depth from the medium as indicated by a line with arrow heads at both ends in FIG. 9) and a constant sense current. From FIG. 10 it will be understood that the reproduction output more suddenly decreases than the proportional relation indicated by the dotted line, and becomes zero at an effective track width of 0.15 μm when extrapolated.

The recording density of 70 G bits/in$^2$ or above needs a reproducing track width (magnetic track width) of 0.2 μm or below. Since a reproduction output of about 1 mV is necessary in order to normally operate the hard disk drive, the reproduction output of the conventional permanent magnet abutted junction type GMR head is too low, and thus the information written on the recording medium cannot be reproduced.

In order to prevent the reproduction output from being drastically reduced due to this narrow track width, an electrode overlap type GMR head is proposed as in JP-A-11-53716.

Figure 11:
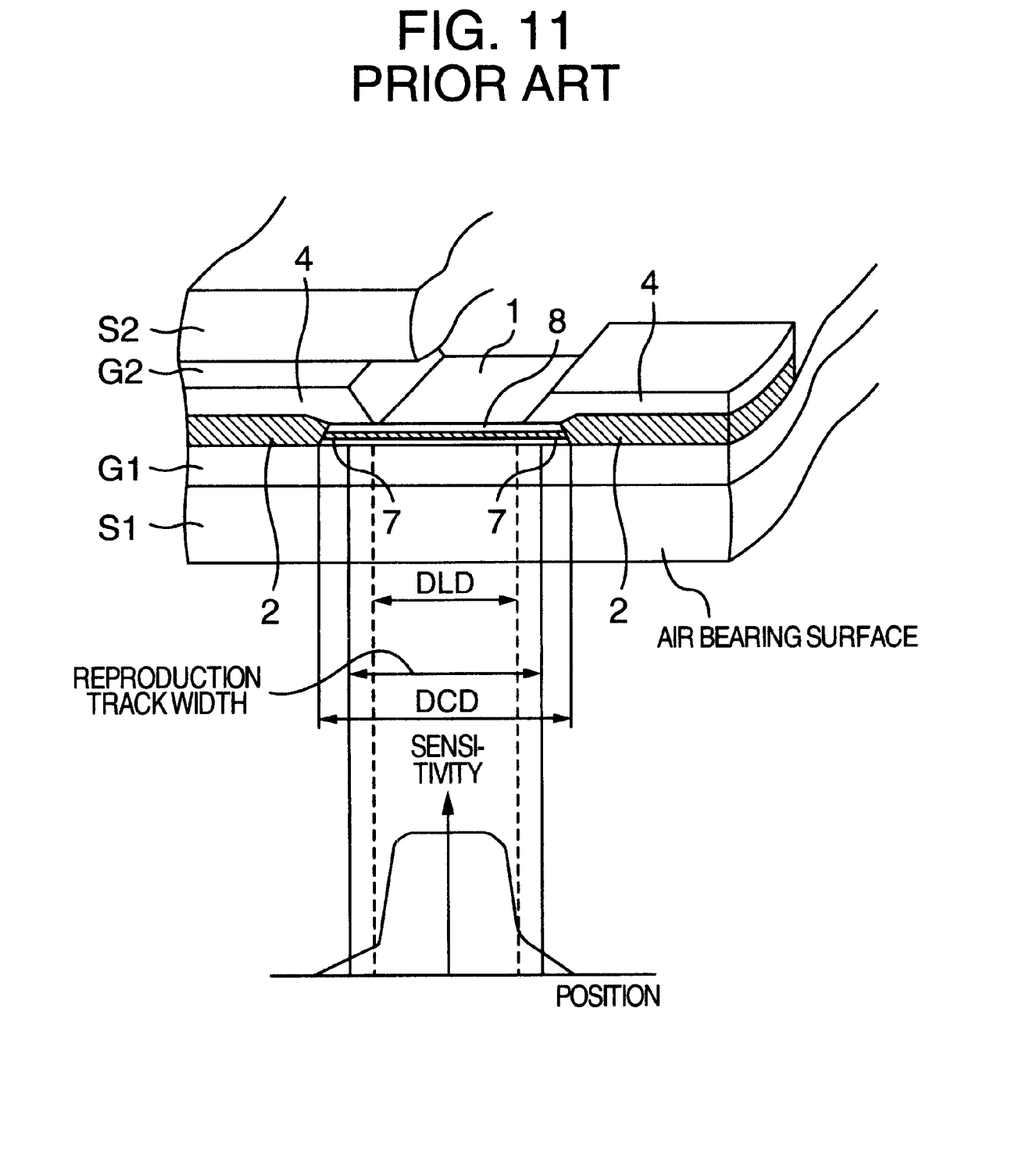
FIG. 11 is a perspective view of a conventional magnetoresistive head as viewed from below, and a diagram showing the sensitivity distribution of the head.

FIG. 11 shows the structure of the electrode overlap type GMR head. This structure has a pair of permanent magnet layers 2 abutted to both the edges of the GMR sensor film 1 that is formed to have a desired width, and a pair of electrode films 4 formed on the permanent magnet layers 2 and overlapped on part of the GMR film 1. Thus, the distance DLD between the pair of electrodes 4 is smaller than the distance DCD between the pair of permanent magnet layers 2 serving as magnetic domain control films.

Since current is caused to flow chiefly in the DLD region of GMR film 1 between the pair of electrodes in the structure shown in FIG. 11, the sensitivity region of the sensor film is the DLD region. Since the permanent magnet layers are sufficiently separated from this region, the sensitivity of the DLD region is expected not to decrease. In other words, the electrode film edges are located out of the low-sensitivity region that is produced by the high field strength near the permanent magnet layers.

However, after detailed examination of the sensor sensitivity distribution, it has been revealed that, as shown in FIG. 11, the sensitivity distribution of the sensor film is wider than the region DLD between the electrodes, resulting in the fact that the reproducing track width is larger than the electrode distance DLD. Therefore, it was found that in order to obtain a desired reproducing track width, the electrode film distance DLD must be decreased to be smaller than the desired width.

The reason for the reproducing track width to be larger than the DLD is that the magnetic flux from the medium into the free layer 8 just under the electrodes propagates up to the free layer of DLD region, changing the resistance of the GMR sensor film. In other words, the magnetic flux flowing from the medium into the free layer right under part of the electrode films 4 that is directly overlapped on the free layer as shown in FIG. 11 affects the DLD region of the sensor film to change the resistance of the GMR sensor film between the electrodes, so that the voltage between the electrodes is changed.

One method for solving the above problem is to reduce the electrode film distance DLD that is expected to be smaller than the reproducing track width. This method, however, requires the photolithography for further narrow distance DLD, and thus has a difficulty in the production process.

Figure 3:
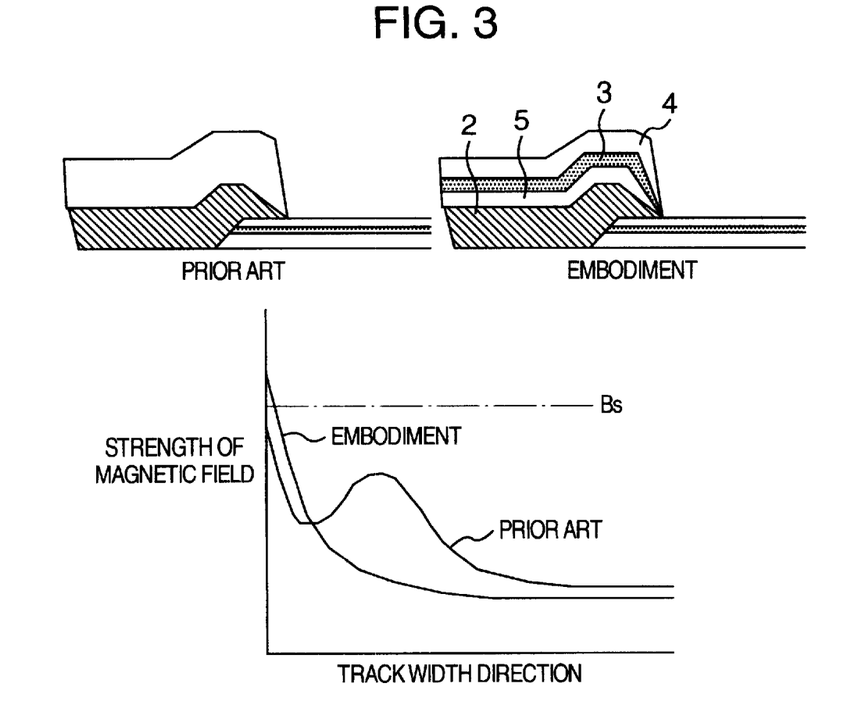
FIG. 3 is a cross-sectional view of the magnetoresistive head of the first embodiment, and a diagram showing the distribution of magnetic field strength in the track width direction.

Another means for improving the sensitivity of the sensor is to reduce the magnetic domain control force by the permanent magnet layers, or to properly weaken the magnetic field strength in the free layer in which the field strength at the edges of the sensor film shown in FIG. 3 is too strong as described later. However, the domain control is not satisfactorily made (the domains are not uniformly magnetized) due to the irregularity of the amount that the electrodes and domain control films are overlapped at the edges of the sensor film and the irregularity of the angles, thus causing the waveform to vary.

The prior art permanent magnet layer abutted junction type head thus has the problem that the output is drastically reduced due to the reduction of the reproducing track width as described above.

SUMMARY OF THE INVENTION

Accordingly, it is an object of the invention to provide a reproduce head with the above problems solved, with high reproduction sensitivity and with narrow reproduction track width without waveform variation.

The present invention employs chiefly the following construction in order to solve the above problems.

A magnetoresistive head having a substrate, first and second magnetic shields formed on the top of the substrate, a magnetoresistive effect film formed within a gap layer between the first and second magnetic shields, a permanent magnet layer formed on both sides of the magnetoresistive effect film to apply a magnetic field thereto, and an electrode film formed on the permanent magnet layer to permit a signal detected current to flow, wherein the magnetic domains of the magnetoresistive effect film are controlled by use of a magnetic film so that the magnetic field strength distribution in the magnetoresistive effect film due to the permanent magnet layer is strong at the edges of the track width, monotonously and abruptly decreases toward the track width center, and becomes uniform in the central region of the track width.

In addition, a magnetoresistive head having a substrate, first and second magnetic shields formed on the top of the substrate, a magnetoresistive effect film formed within a gap layer between the first and second magnetic shields, a permanent magnet layer provided on both sides of the magnetoresistive effect film in order to apply a magnetic field thereto, and an electrode film provided on the permanent magnet layer in order to permit a signal detected current to flow, wherein a magnetic film is stacked on the permanent magnet layer with a nonmagnetic separation layer interposed between them so that the magnetic film has formed therein a magnetic path in which the magnetic flux is in the opposite direction to that in the permanent magnet layer and controls the magnetic domains of the magnetoresistive effect film.

Moreover, a magnetoresistive head having a substrate, first and second magnetic shields formed on the top of said substrate, a magnetoresistive effect film formed within a gap layer between the first and second magnetic shields, a permanent magnet layer provided on both sides of the magnetoresistive effect film in order to apply a magnetic field thereto, and an electrode film provided on the permanent magnet layer in order to permit a signal detected current to flow, wherein a magnetic film is stacked on the permanent magnet layer so as to have formed therein a magnetic path in which the magnetic flux is in the same direction as that in the permanent magnet layer and controls the magnetic domains of the magnetoresistive effect film.

Also, a magnetoresistive head having a substrate, first and second magnetic shields formed on the top of the substrate, a magnetoresistive effect film formed within a gap layer between the first and second magnetic shields, a permanent magnet layer formed on both sides of the magnetoresistive effect film in order to apply a magnetic field thereto, and an electrode film formed on the permanent magnet layer in order to permit a signal detected current to flow, wherein a magnetic film is formed on both sides of the magnetoresistive effect film so as to converge the magnetic flux from the permanent magnet layer, thereby controlling the magnetic domains of the magnetoresistive effect film.

DESCRIPTION OF THE EMBODIMENTS

Figure 1:
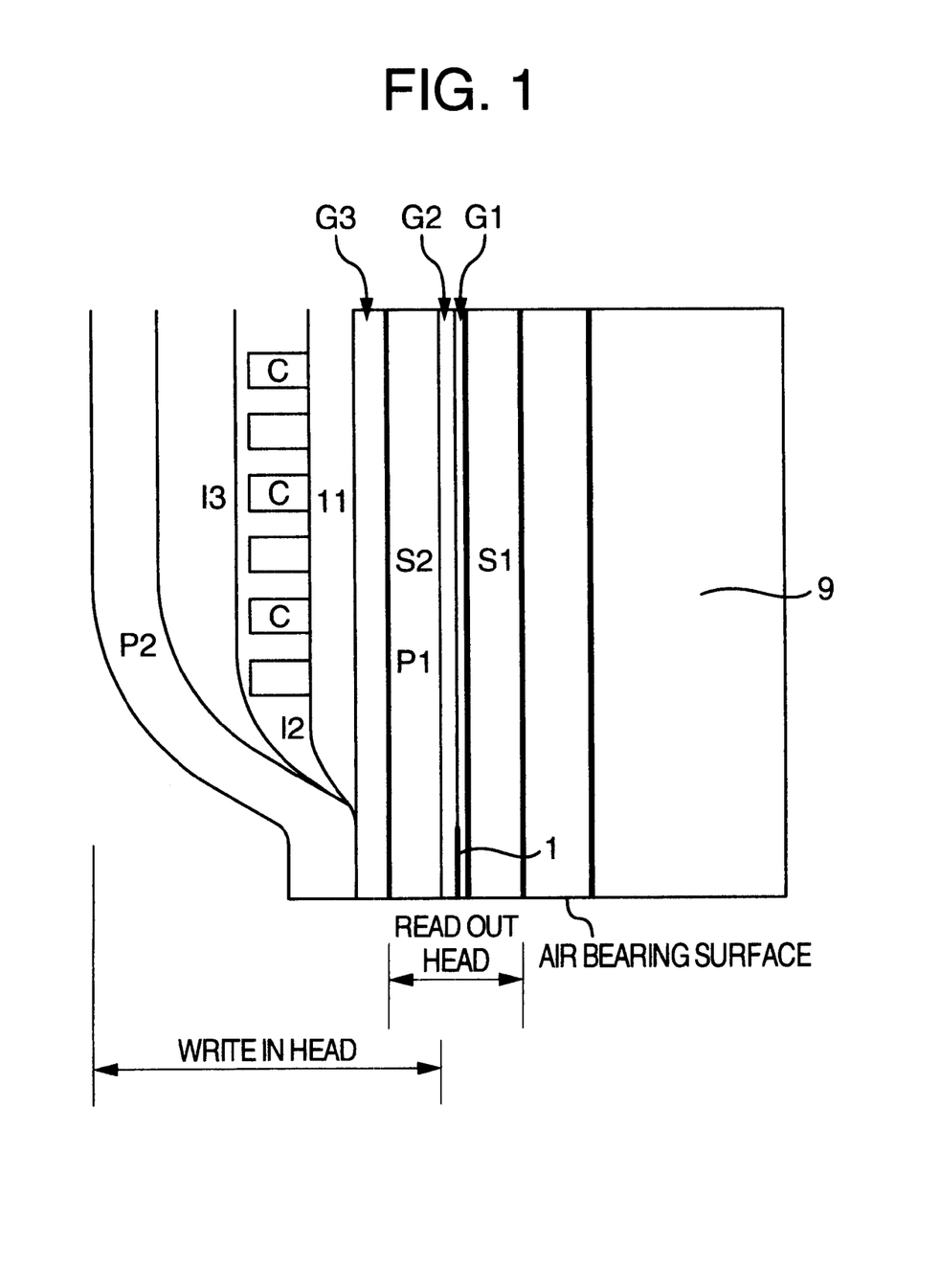
FIG. 1 is a cross-sectional view of the structure of a typical magnetic head having a write head portion and an MR read head.

Magnetoresistive heads (MR head) of embodiments of the invention will be described with reference to drawings. The basic construction of the MR head will first be mentioned below. FIG. 1 is a cross-sectional view of a typical magnetic head having a write head portion and an MR read head. The magnetic head has its air-bearing surface (ABS) formed by lapping. The ABS is maintained to be raised by a distance away from the surface of magnetic medium by the air bearing. The read head has the MR sensor 1 interposed between first and second gap layers G1, G2 which are further held between first and second shield layers S1, S2. The MR sensor 1 in the conventional MR head is a spin valve sensor.

The write head has a coil layer C and an insulating layer 12 interposed between insulating layers 11 and 13 which are further held between first and second magnetic pole pieces P1, P2. A third gap G3 is provided to be held between the first and second magnetic pole pieces P1, P2 at their front edges adjacent to the ABS, and thus to form a magnetic gap.

In the writing operation, a signal current is conducted to flow through the coil layer C, and the magnetic flux leaks out at the air bearing surface. This leaking magnetic flux magnetizes the tracks on the magnetic medium that is rotated in the writing mode. In the reading operation, the magnetized region of the rotating magnetic medium injects the magnetic flux into the MR sensor 1 of the read head, causing the resistance of the inside of the MR sensor 1 to change. This resistance change is detected by the detection of the voltage change across the MR sensor 1.

Figure 2:
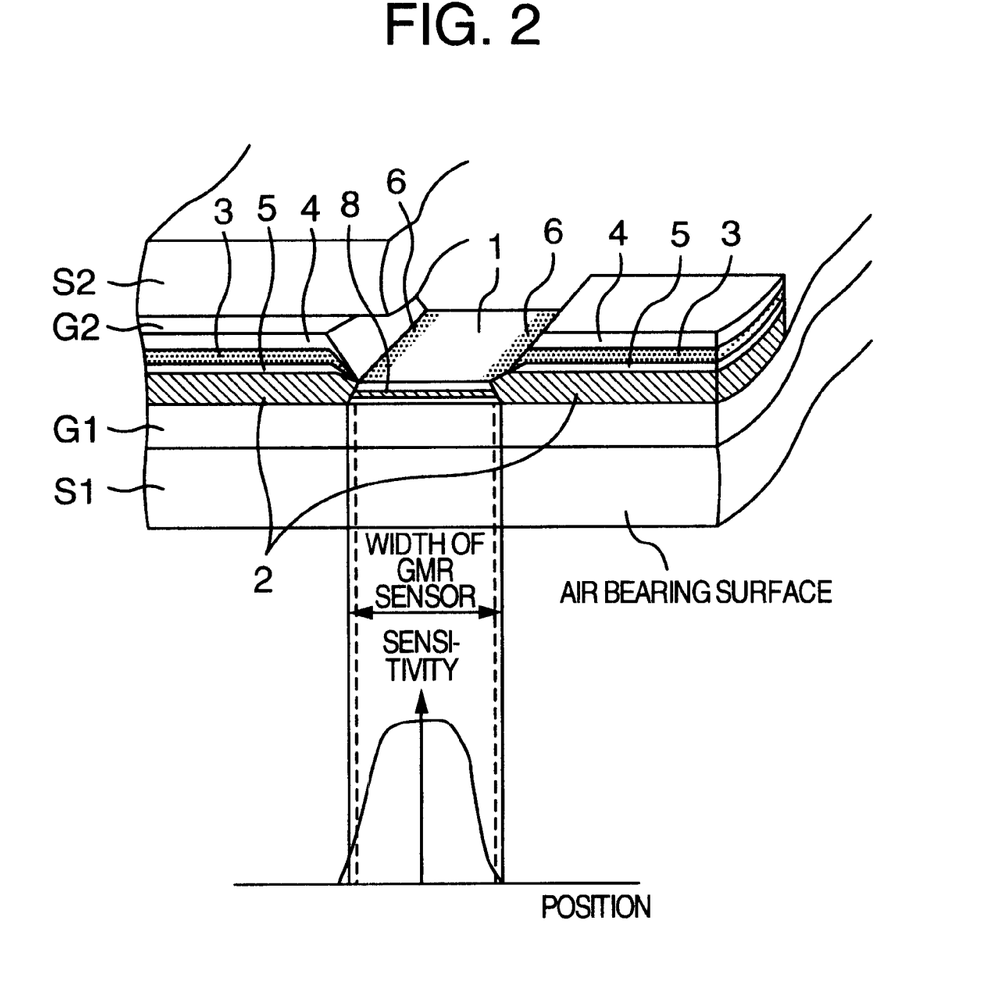
FIG. 2 is a perspective view of a magnetoresistive head of the first embodiment of the invention as viewed from below, and a diagram showing the sensitivity distribution of the head.

The magnetoresistive head of the fist embodiment of the invention will be described with reference to FIGS. 2 and 3 and FIGS. 4A and 4B. Referring to FIG. 2, a spacer film 5 having a magnetic separation function and soft magnetic film 3 in addition to the permanent magnet layer 2 for controlling the magnetic domains of the GMR sensor film and electrode film 4 are provided on both sides of the GMR sensor film 1. In other words, one of the features of this embodiment is the provision of stacked films of permanent magnet layer 2, spacer film 5, soft magnetic film 3 and electrode film 4 in this order on both sides of the GMR sensor film 1. The GMR sensor film 1 is provided within the reproducing magnetic gap held between the first and second magnetic shields S1, S2, and a pair of permanent magnet layers (domain control films 2) are abutted on both sides of the GMR sensor film 1. The spacer film 5 that is a nonmagnetic separation film is desired to have a thickness of 1 nm or above enough to magnetically separate the permanent magnet layer 2 and the soft magnetic film 3.

The first embodiment is to control the magnetic domains of the GMR sensor film 1 by the stacked films of permanent magnet layer 2, nonmagnetic separation film 5 and soft magnetic film 3 shown in FIG. 2.

As shown in FIG. 3, the conventional structure consisting of the permanent magnet layer and the electrode film (as viewed on the top left of FIG. 3) causes a magnetic field distribution having a ripple on the edges of the GMR film by the effect of the permanent magnet layer 2 run on the GMR film at the edges, making a magnetically unstable condition. That is, as illustrated in the graph of field strength distribution with respect to the track width direction shown on the bottom of FIG. 3, the field strength curve in the conventional head is not uniformly attenuated in the track width direction, but has a hump-shape characteristic exhibiting a ripple in the field strength distribution. This hump-shape characteristic destabilizes the gradient of magnetic domains affected by the magnetic field from the medium, leading to the unstable variation of the magnetic resistance change. The occurrence of this hump-shape characteristic can be supposed to be the result of the addition of the magnetic flux produced from the overlap of the permanent magnet layer on the GMR sensor film to the magnetic flux fed from the ends of the free layer into the free layer (the shaded area in FIG. 3) of the GMR sensor film. In addition, the edge field affects not only the edges but also the track center, thus changing the reproduction output. In FIG. 3, Bs indicates the flux saturation density of the free layer.

The GMR sensor film is generally the laminated films consisting of an antiferromagnetic film, a ferromagnetic film (a film in which an exchange coupling field is produced), a nonmagnetic film (for example, copper Cu), a free layer (of which the magnetic domains are controlled by the permanent magnet layer and of which the domain gradient is changed the magnetic field from the magnetic recording medium), and a protective film.

Figure 4A:
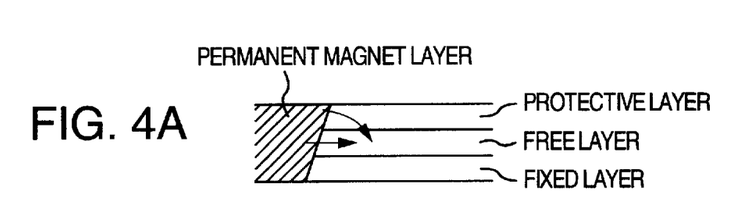
FIGS. 4A and 4B are diagrams showing the relations of domain control film (for example, permanent magnet layer) and GMR sensor film.
Figure 4B:
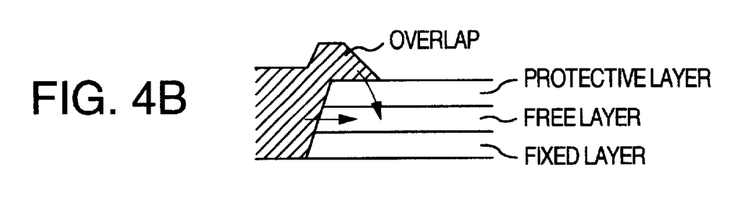

FIGS. 4A, 4B and 4C show different relations between the permanent magnet layer and GMR sensor film coupled together. FIG. 4A shows a structure in which the edges of the permanent magnet layer are coupled to the GMR sensor film with their thickness matched, and FIG. 4B another structure in which a part of the edges of the permanent magnet layer is overlapped on part of the top of the edges of the GMR sensor film. These coupling structures typically show the basic relations of those magnet layer and GMR sensor film. The actual MR head, when the films are formed by the well-known lift-off production process, strictly does not have the structure shown in FIG. 4A, but somewhat has such an overlap structure as shown in FIG. 4B. In addition, irrespective of whether there is the overlap of the permanent magnet layer, the magnetic flux flowing via different paths (as indicated by the arrows in FIGS. 4A and 4B) from the permanent magnet layer is concentrated to a location slightly separated away from the edges of the free layer as shown in FIGS. 4A and 4B.

Figure 8A:
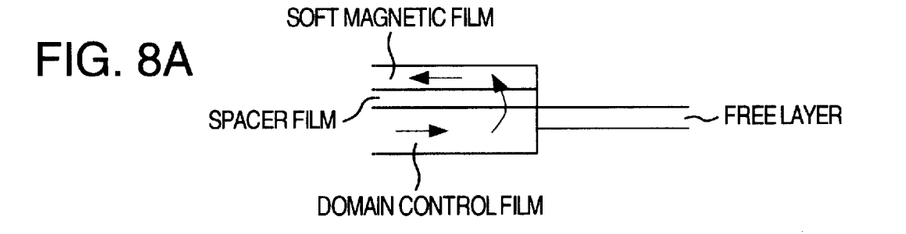
FIGS. 8A, 8B and 8C are schematic diagrams showing qualitative constructions of the magnetoresistive heads of the first, second and third embodiments of the invention.

According to the first embodiment of the invention, as shown on the top right corner of FIG. 3, the extra magnetic flux at the edges of the permanent magnet layer flows toward the soft magnetic film 3 (as indicated by the arrow), thus not affecting the GMR film 1. In other words, as schematically shown in FIG. 8A, the extra magnetic flux from the permanent magnet layer does not enter the free layer, but flows through the spacer film into the soft magnetic film so that a magnetic path can be formed in the opposite direction to the direction in which the magnetic flux flows in the permanent magnet layer. Since only the flux from the permanent magnet layer made in contact with the free layer flows into the free layer, such a magnetic field strength distribution as shown on the bottom of FIG. 3 can be obtained which is strong at the edges of the track width, monotonously and abruptly decreases the strength toward the center of the track width, and is uniform in the central portion of the track width.

Therefore, there is no ripple at the edges of the GMR sensor film 1, and thus a magnetically stable condition can be brought about. In addition, there is no effect of the edge field on the central portion of the track, and thus the reproduction output is not reduced and not changed. As the sensitivity distribution of the GMR sensor film in the track width direction is shown in FIG. 2, the rectangular sensitivity distribution covers the region of permanent magnet layer distance DCD and has no low-sensitivity region, thus enabling the reproduction head to have a high sensitivity.

Moreover, the GMR sensor film can be specifically constructed by using, for example, from the first magnetic shield film side, (1) a bottom type spin valve of a base layer/100 PtMn/12 CoFe/8 Ru/20 CoFe/21 Cu/10 CoFe/20 NiFe/10 Cu/20 Ta (the numbers indicate thickness in Angstroms), (2) a top type spin valve of a base layer/20 NiFe/10 CoFe/21 Cu/20 CoFe/8 Ru/12 CoFe/100 PtMn (Angstroms), or (3) a dual type spin valve of a base layer/100 PtMn/15 CoFe/8 Ru/20 CoFe/21 Cu/7 CoFe/17 NiFe/7 CoFe/21 Cu/20 CoFe/8 Ru/15 CoFe/100 PtMn/20 Ta (Angstroms).

The permanent magnet layer can be made of CoCrPt alloy film or CoPt alloy film on Cr base film. The nonmagnetic separation film can be made of Ta, Cr or Au.

The soft magnetic layer can be made of NiFe alloy or an alloy containing NiFe as a chief component and additional elements of at least one or more selected from elements Co, Ti, V, Cr, Zr, Nb, Mb, Hf, Ta, W, Cu, Ru, Rh, pd, Os, Ir, Pt and Au. The merit of the additional elements is to reduce the magnetoresistive effect of the soft magnetic layer. The electrode material may be, for example, Ta or Au on a base film of TaW.

Figure 8B:
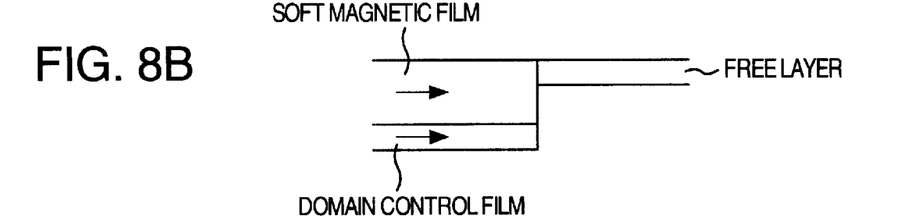

The second embodiment of the invention will be described with reference to FIG. 8B. While the head of the first embodiment is constructed by stacked films of a permanent magnet layer, a nonmagnetic separation layer and a soft magnetic film stacked in this order, the head of the second embodiment has no nonmagnetic separation layer, or is constructed by stacked films of a permanent magnet layer and a soft magnetic layer stacked directly with no nonmagnetic separation layer, and controls the magnetic domains of GMR sensor film by the permanent magnet layer and soft magnetic film. In addition, the free layer is coupled to the edges of the soft magnetic film as shown in FIG. 8B. The magnetic flux produced in the soft magnetic film stacked directly on the permanent magnet layer is magnetically induced in the same direction as that in the permanent magnet layer. This induced magnetic flux in the soft magnetic flux is guided into the free layer. In this case, the free layer is arranged so that a magnetic path cannot be formed from the edges of the permanent magnet layer directly to the free layer.

Figure 5:
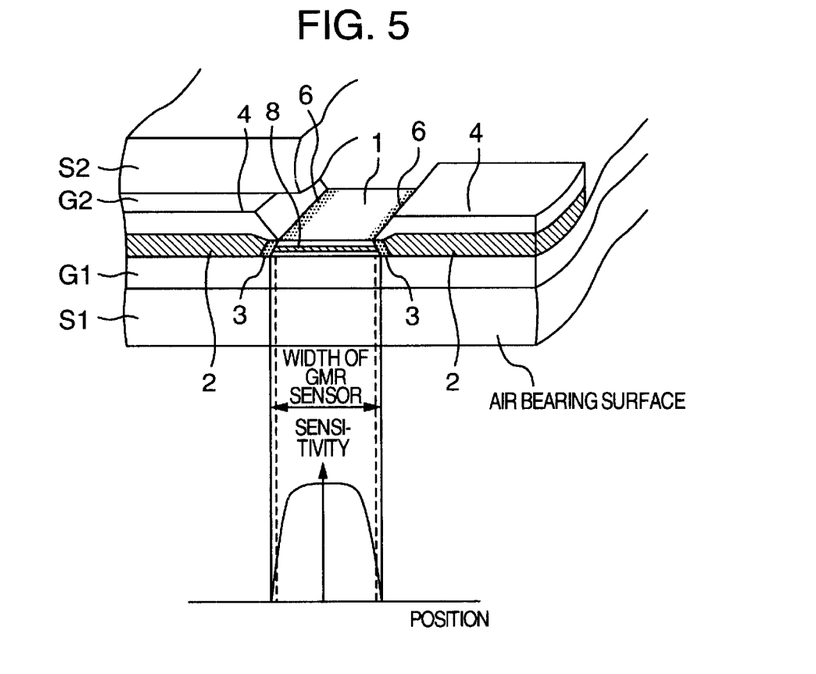
FIG. 5 is a perspective view of a magnetoresistive head of the third embodiment of the invention, and a diagram showing the sensitivity distribution of the head.

The third embodiment of the invention will be described with reference to FIGS. 5 and 6 and FIGS. 7A and 7B. The GMR sensor film 1 is provided within the magnetic gap held between the first and second magnetic shields S1, S2 as shown in FIG. 5. A pair of soft magnetic film regions 3 are provided adjacent to both sides of the GMR sensor film, and the permanent magnet layers 2 are also arranged on both sides of the soft magnetic films. In addition, the electrode layer 4 is formed on the soft magnetic films 3 and permanent magnet layers 2 as illustrated.

Figure 6:
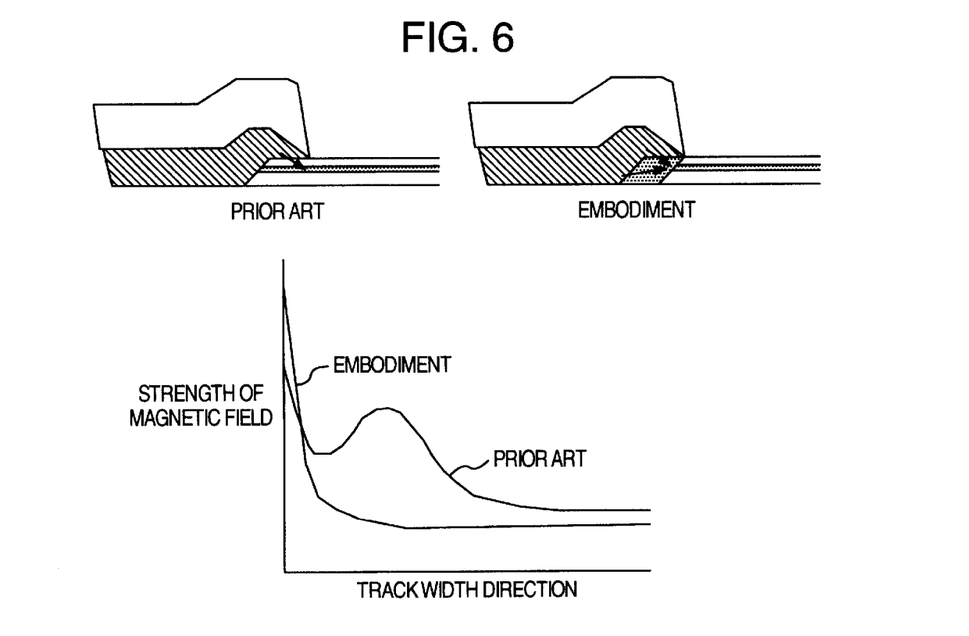
FIG. 6 is a cross-sectional view of the magnetoresistive head of the third embodiment, and a diagram showing the distribution of magnetic field strength in the track width direction.

Since the magnetic flux from the permanent magnet layer 2 converges in the soft magnetic film region 3 and is guided to the GMR sensor film 1 as shown on the top right corner of FIG. 6, it can effectively control the magnetic domains. Therefore, the edges of the GMR sensor film 1 can be made magnetically stable. In addition, since there is no edge field effect on the track central portion, the reproduction output is not reduced. As the sensitivity distribution of this sensor in the track width direction is shown in FIG. 5, the rectangular-shape sensitivity distribution covers the region of the soft magnetic film distance DSD and has no low-sensitivity region, thus enabling the reproducing head to have a high sensitivity.

Figure 7A:
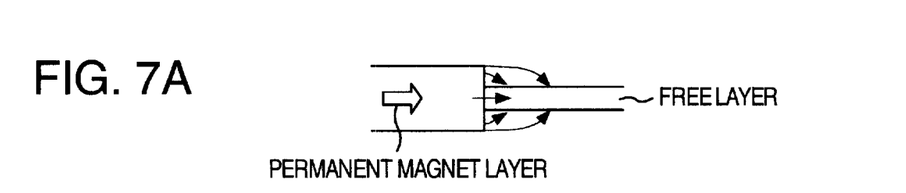
FIGS. 7A and 7B are diagrams to which reference is made in explaining the functions and actions of the magnetoresistive head of the third embodiment.
Figure 7B:
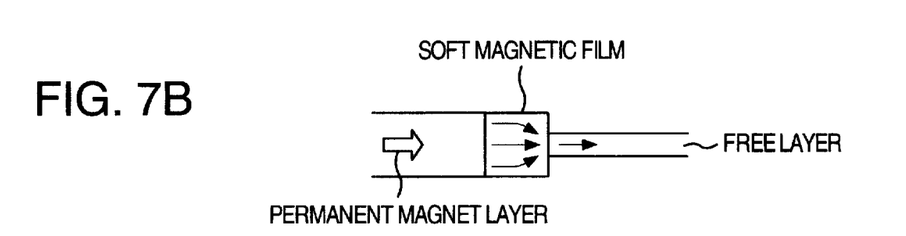
Figure 8C:
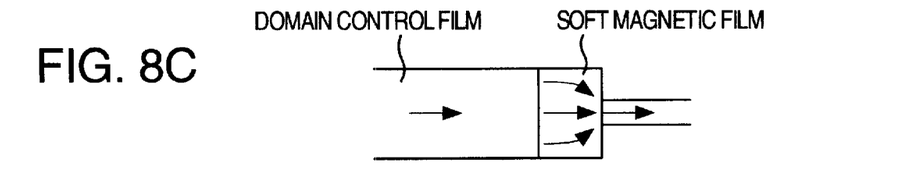

FIG. 7B is a diagram for qualitative description of the third embodiment, and FIG. 7A a diagram for qualitative description of the prior art. As shown in FIG. 7A, the magnetic paths from the permanent magnet layer to the free layer are almost from the edges of permanent magnet layer that are made in direct contact with the free layer. There are other magnetic paths as indicated by arrows along which the magnetic flux from each part of the edges of the permanent magnet layer flows in locations near the central portion of the free layer, causing a domain unstable characteristic like the hump characteristic shown in the magnetic field strength distribution of FIG. 6. On the contrary, according to the third embodiment, as shown in FIG. 7B, all magnetic flux converges in the soft magnetic film made in contact with the free layer, but not branches away to the free layer. Thus, as shown in FIG. 6, a magnetic field strength distribution curve can be obtained that exhibits a strong field at the edges of track width, monotonously and abruptly decreases toward the track width center and becomes uniform at the central portion of track width. FIG. 8C is also a diagram for qualitative explanation of the third embodiment of the invention.

The GMR sensor film can be constructed as, for example, shown in FIGS. 8A, 8B and 8C that were used for the description of the first embodiment of the invention. In addition, the soft magnetic film and permanent magnet layer can be formed according to, for example, the construction shown when the first embodiment was described.

As described above, the present invention includes the following structure, functions and actions. The conventional permanent magnet layer abutted junction type, when constructed for narrow track, remarkably reduces the reproduction sensitivity because the low-sensitivity region existing near the permanent magnet layer increases the proportion at which it occupies the reproduction track width. Therefore, the proportion of this low-sensitivity region is requested to reduce. In order to reduce the proportion at which the low-sensitivity region occupies the reproduction track width, the invention employs such a construction as to properly select the amount of magnetic flux applied from the magnetic domain control film formed by the permanent magnet layer.

The first embodiment is directed to restricting the extra magnetic flux that is generated from the permanent magnet layer and is not useful for controlling the magnetic domains of GMR sensor film. The magnetic flux generated from the permanent magnet layer is used for controlling the magnetic domains of the GMR sensor film, but part of the magnetic flux flows to the shields. It is important here that such a phenomenon occurs as to weaken the domain control force of the edges of free layer and strengthen the domain control (magnetic field strength from the permanent magnet) for the regions from the free layer edges to near the central portion of the free layer depending on the overlap shape of the permanent magnet on the free layer (as indicated by the hump portion in the field strength distribution in FIG. 3). In other words, when the amount of overlap is large, the shunt part of the flux strengthens the domain control, and reduces the sensitivity of GMR sensor film. In addition, this effect becomes more intense as the track width narrows. Thus, a magnetic feedback circuit for the extra domain control flux should be formed to remove the effect of the shunt flux on the GMR sensor film.

According to the second embodiment, a magnetic circuit is formed to enable that the shunt flux from the permanent magnet layer is forced to flow in the soft magnetic film directly formed on the permanent magnet layer, and that this soft magnetic film is coupled to the free layer to control the magnetic domains of the free layer, thus achieving the same effect as in the first embodiment.

According to the third embodiment, a flux guide portion made of a soft magnetic material for effectively guiding the flux from the permanent magnet layer to the sensor edge portion is provided adjacent to the MR sensor film edge portion. This flux guide portion serves as a lens for converging the flux from the permanent magnet layer in order to achieve a good characteristic with no variation in the magnetic field strength distribution of the free layer in the track width direction.

Thus, according to the invention mentioned above, by controlling the unnecessary flux that does not contribute to the domain control of track edges, it is possible to improve the domain controllability at the track edges, decrease the low-sensitivity region in the reproduction track range, and make the GMR head have high reproduction sensitivity. In addition, by mounting this magnetoresistive head, it is possible to provide a magnetic recording/reproducing apparatus that can satisfactorily reproduce the high-density recorded information.

It will be further understood by those skilled in the art that the foregoing description has been made on embodiments of the invention and that various changes and modifications may be made in the invention without departing from the spirit of the invention and scope of the appended claims.

What is claimed is:

1. A magnetoresistive head comprising:

a substrate;

first and second magnetic shields formed on the top of said substrate;

a magnetoresistive effect film formed within a gap layer between said first and second magnetic shields;

a permanent magnet layer provided on both sides of said magnetoresistive effect film in order to apply a magnetic field thereto; and an electrode film provided on said permanent magnet layer in order to permit a signal detected current to flow, wherein a magnetic film is stacked on said permanent magnet layer with a nonmagnetic separation layer interposed between them so that said magnetic-film has formed therein a magnetic path in which the magnetic flux is in the opposite direction to that in said permanent magnet layer and controls the magnetic domains of said magnetoresistive effect film.

2. A magnetoresistive head according to claim 1, wherein the edges of a free layer of said magnetoresistive effect film are coupled to the edges of said permanent magnet layer.

3. A magnetoresistive head comprising:

a substrate;

first and second magnetic shields formed on the top of said substrate;

a magnetoresistive effect film formed within a gap layer between said first and second magnetic shields;

a permanent magnet layer provided on both sides of said magnetoresistive effect film in order to apply a magnetic field thereto; and an electrode film provided on said permanent magnet layer in order to permit a signal detected current to flow, wherein a magnetic film is stacked on said permanent magnet layer so as to have formed therein a magnetic path in which the magnetic flux is in the same direction as that in said permanent magnet layer and controls the magnetic domains of said magnetoresistive effect film.

4. A magnetoresistive head according to claim 3, wherein the edges of a free layer of said magnetoresistive effect film are coupled to the edges of said magnetic film.

5. A magnetoresistive head comprising:

a substrate;

first and second magnetic shields formed on the top of said substrate;

a magnetoresistive effect film formed within a gap layer between said first and second magnetic shields;

a permanent magnet layer provided on both sides of said magnetoresistive effect film in order to apply a magnetic field thereto; and an electrode film provided on said permanent magnet layer in order to permit a signal detected current to flow, wherein a magnetic film is formed on both sides of said magnetoresistive effect film so as to converge the magnetic flux from said permanent magnet layer, thereby controlling the magnetic domains of said magnetoresistive effect film.

6. A magnetoresistive head according to claim 5, wherein said electrode film is stacked on said permanent magnet layer and on said magnetic film.

7. A magnetoresistive head comprising:

a substrate;

first and second magnetic shields formed on the top of said substrate;

a magnetoresistive effect film formed within a gap layer between said first and second magnetic shields;

a permanent magnet layer provided on both sides of said magnetoresistive effect film in order to apply a magnetic field thereto; and an electrode film provided on said permanent magnet layer in order to permit a signal detected current to flow;

wherein the magnetic domains of said magnetoresistive effect film are controlled by use of a magnetic film so that the magnetic field strength distribution in said magnetoresistive effect film due to said permanent magnet layer is strong in the edges of the track width, monotonously and abruptly decreases toward the center of the track width, and becomes uniform in the central region of the track width; and wherein said magnetic film is made of a soft magnetic material.

* * * * *